(12) United States Patent
Alhussien et al.

(10) Patent No.: US 11,403,032 B2
(45) Date of Patent: Aug. 2, 2022

(54) DATA TRANSFER MANAGEMENT WITHIN A MEMORY DEVICE HAVING MULTIPLE MEMORY REGIONS WITH DIFFERENT MEMORY DENSITIES

(71) Applicant: Micron Technology, Inc., Boise, ID (US)

(72) Inventors: Abdelhakim Alhussien, San Jose, CA (US); Ayberk Ozturk, San Jose, CA (US); Karl D. Schuh, Santa Cruz, CA (US); Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/948,275

(22) Filed: Sep. 10, 2020

(65) Prior Publication Data

US 2022/0075551 A1 Mar. 10, 2022

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0655; G06F 3/0679; G06F 3/0604
See application file for complete search history.

(56) References Cited

U.S. PATENT DOCUMENTS

| 10,430,108 | B2 | 10/2019 | Natarajan et al. |
| 2011/0252187 | A1* | 10/2011 | Segal ................. G06F 12/0246 711/103 |
| 2013/0173857 | A1 | 7/2013 | Cheon et al. |
| 2018/0081594 | A1* | 3/2018 | Jung .................... G11C 7/1084 |
| 2019/0036549 | A1 | 1/2019 | Yang et al. |
| 2019/0187900 | A1* | 6/2019 | Byun .................... G06F 3/0608 |
| 2019/0332290 | A1* | 10/2019 | Meeker ................ G06F 3/0685 |
| 2020/0210101 | A1 | 7/2020 | Lin |

(Continued)

OTHER PUBLICATIONS

Alsalibi et al., 'A survey of techniques for architecting SLC/MLC/TLC hybrid Flash memory-based SSDs', Concurrency and Computation: Practice and Experience, Jul. 10, 2018; pp. 1-21; vol. 30, Issue 13, e44 20. 27 pages.

(Continued)

*Primary Examiner* — Mark A Giardino, Jr.
(74) *Attorney, Agent, or Firm* — Lowenstein Sandler LLP

(57) ABSTRACT

Data from a host system is received at a memory device, where the memory device includes a primary region to initially store the data received from the host system and one or more secondary regions to store data transferred from the primary region. A write operation is performed on one or more write units of the primary region with the data received from the host system, where a write unit of the primary region has lower density blocks than a write unit of the secondary region. Whether a subset of write units of the primary region corresponding to a pre-determined number of write units is written with at least a portion of the data received from the host system is determined. In response to determining that the subset of write units of the primary region is written, another write operation is performed on at least one write units of the secondary region with respective data of the subset of write units of the primary region.

17 Claims, 7 Drawing Sheets

(56) References Cited

U.S. PATENT DOCUMENTS

2021/0141721 A1* 5/2021 Li .................... G06F 3/0608
2021/0263821 A1* 8/2021 Yang ............... G06F 11/3058
2021/0271611 A1* 9/2021 Therene ............ G06F 9/5094

OTHER PUBLICATIONS

International Search Report and Written Opinion dated Dec. 22, 2021, on application No. PCT/US2021/048285. 10 pages.

* cited by examiner

DATA TRANSFER MANAGEMENT WITHIN A MEMORY DEVICE HAVING MULTIPLE MEMORY REGIONS WITH DIFFERENT MEMORY DENSITIES

TECHNICAL FIELD

Embodiments of the disclosure relate generally to memory sub-systems, and more specifically, relate to data transfer management within a memory device having multiple memory regions with different memory densities.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
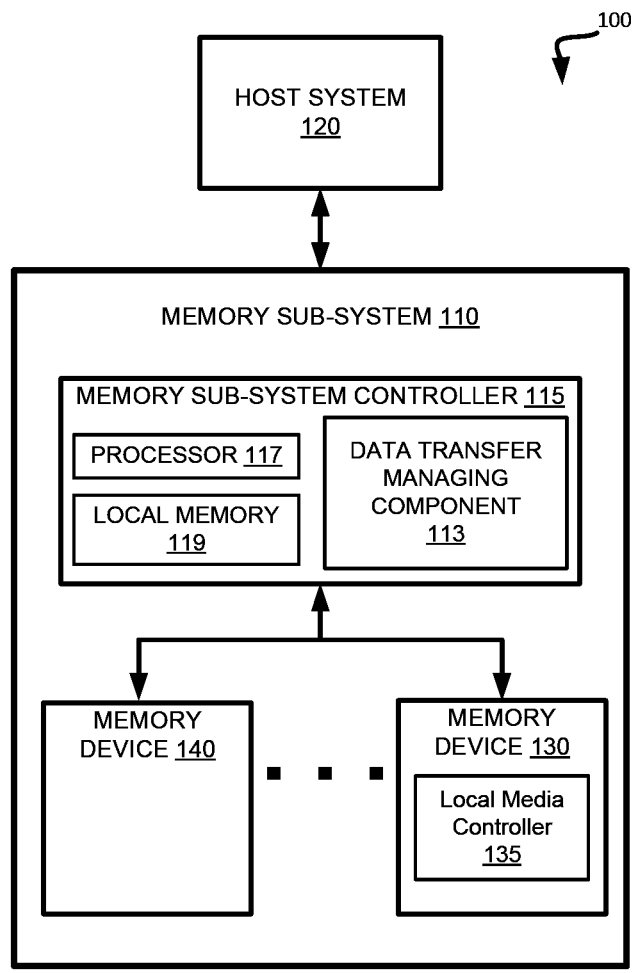
FIG. 1 illustrates an example computing environment that includes a memory sub-system in accordance with some embodiments of the present disclosure.

Aspects of the present disclosure are directed to data transfer management within a memory device having multiple memory regions with different memory densities. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

The memory devices can include volatile and non-volatile memory devices that can store data from the host system. One example of non-volatile memory devices is a negative-and (NAND) memory device. Other examples of non-volatile memory devices are described below in conjunction with FIG. 1. Each of the non-volatile memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values. For example, a single level cell (SLC) can store one bit of information and has two logic states. As another example, a quad level cell (QLC) can store four bits of information and has sixteen logic states.

Various memory access operations can be performed on the memory cells. Data can be written to, read from, and erased from memory cells. Memory cells can be grouped into a write unit, such as a page. For some types of memory devices, a page is the smallest write unit. For some types of memory devices (e.g., NAND), memory cells can be grouped into an erase unit, such as a physical block, which is a group of pages. A physical block is a 2-dimensional memory array of pages (rows of cells) and strings (columns of cells). Data can be written to a block, page-by-page. Data can be erased at a block level. However, portions of a block cannot be erased.

A region (e.g., memory cells in the same erase unit, such as a block) of a physical memory device (e.g., NAND) can be configured as a lower density cell type, for example, as SLC, and can operate in a respective lower density mode (e.g., SLC mode). Another region can be configured as a higher density cell type, for example, as QLC, and can operate in a respective higher density mode (e.g., QLC mode). For simplicity, SLC is used throughout this description as one example of a lower density cell type, and QLC is used throughout this description as one example of a higher density cell type.

Although more bits can be stored in a higher density block (e.g., QLC block) compared to a lower density block (e.g., SLC block), writing data to a QLC block is typically slower than writing data to a SLC block. For simplicity, a SLC block is used throughout this description as one example of a lower density block, and a QLC block is used throughout this description as one example of a higher density block.

To improve performance, a memory sub-system can utilize a region of a memory device having lower density blocks as cache. For example, the cache can be a SLC cache. A memory sub-system controller can configure a region (e.g., memory cells in the same erase unit, such as a block) of a physical memory device (e.g., NAND) as a lower density cell type, for example, as SLC, and can operate in a respective lower density mode (e.g., SLC mode). Another region can be configured as a higher density cell type, for example, as QLC, and can operate in a respective higher density mode (e.g., QLC mode).

The memory sub-system can prioritize host write requests and write the data for the host write requests to the caching region (e.g., SLC cache). As the SLC cache is filled, data can be relocated to a higher density region, (e.g., QLC blocks).

A conventional memory device can transfer the data written to the region having lower density blocks (e.g., SLC) to a region having higher density blocks (e.g., QLC) when the host system is idle. When the host system becomes active again, the conventional memory device switches back to storing data to the region having lower density blocks. However, when the conventional memory device has switched back to program data to the region having lower density blocks, a block (e.g., a QLC block) in the region having higher density blocks can be left open. That is, the QLC block may not be fully written and thus, have only some pages programmed. In the next time when the host system becomes idle for the conventional memory device to write data to the rest of the pages at the QLC block, high reliability errors (HREs) can be introduced in the next pass programming operation. Because a period of time has passed since the last programming operation at the QLC block, a charge loss is likely to have incurred at the memory cells of the previously written pages and accordingly, wrong bit information can be read while reading the previously written information for the next pass programming. Therefore, the conventional memory device inevitably propagates the internal read errors to the subsequent pass programming. Nevertheless, the conventional memory device does not provide an error correction solution for errors propagated from the internal read of information at the previously written pages of the QLC block. Moreover, a low density parity check (LDPC) or any other error correction code (ECC) may not correct such errors because an error correction operation of the LDPC or other ECCs is performed based on an assumption that the written data is at least close to reliable.

Aspects of the present disclosure address the above and other deficiencies by having a memory sub-system that transfers data stored at a memory region having lower density blocks to another memory region with higher density blocks in a lock-step manner regardless of a state (e.g., idle or active) of a host system. As soon as the memory sub-system determines that write units at the region having lower density blocks stores enough data to be fully programmed at a single write unit of the region having higher density blocks, the memory sub-system migrates the data from the region having lower density blocks to the region having higher density blocks. While migrating the data, the memory sub-system writes multiple bit information at once to all pages in a block or all cells in a page of the region having higher density blocks, thereby eliminating any need of the internal reading.

Advantages of the present disclosure include, but are not limited to increased memory capacity because the size of the region having lower density blocks can be kept minimal and accordingly, more memory cells can be allocated to the region having higher density blocks. Moreover, another advantage of the present disclosure can include preservation of data integrity by eliminating internal errors introduced in multiple stages of programming pass operations. Accordingly, memory cells have reduced error rates and thus, are capable of longer program and erase (P/E) cycles, resulting in a longer life expectancy.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, a vehicle (e.g., airplane, drone, train, automobile, or other conveyance), Internet of Things (IoT) devices, or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components, such as memory devices 130, when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory devices such as 3D cross-point type and NAND type memory are described, the memory device 130 can be based on any other type of non-volatile memory, such as read-only memory (ROM), phase change memory (PCM), magneto random access memory (MRAM), negative-or (NOR) flash memory, electrically erasable programmable read-only memory (EEPROM), and a cross-point array of non-volatile memory cells.

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some implementations, a particular memory device can include an SLC region, and an MLC region, a TLC region, or a QLC region of memory cells. Such a region in a memory device can include a group of memory cells configured as SLCs, MLCs, TLCs, or QLCs within an area of the memory device. The memory cells of the memory devices 130 can be grouped as pages or codewords that can refer to a write unit or a logical unit of the memory device used to store data. With some types of memory (e.g., NAND), pages can be grouped to form a block as a write unit or a logical unit to store data. Some types of memory, such as 3D cross-point, can group pages across dice and channels to form management units (MUs).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA, namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a data transfer managing component 113 that manages transferring data from one region of a memory device 130 to another region of the memory device 130, where the latter region has higher density blocks than the former. In some embodiments, the memory sub-system controller 115 includes at least a portion of the data transfer managing component 113. For example, the memory sub-system controller 115 can include a processor 117 (processing device) configured to execute instructions stored in local memory 119 for performing the operations described herein. In some embodiments, the data transfer managing component 113 is part of the host system 110, an application, or an operating system.

The data transfer managing component 113 can receive data from the host system 120 for storage in a memory device 130. The memory device 130 can have a primary region that initially stores the data received from the host system and one or more secondary regions that stores data transferred from the primary region. The data transfer managing component 113 can perform a write operation on one or more write units of the primary region with the data received from the host system 120. While performing the write operation, the data transfer managing component 113 can monitor the progress of the write operation to determine whether a subset of write units of the primary region corresponding to a pre-determined number of write units is written with at least a portion of the data received from the host system 120. In response to determining that the subset of write units of the primary region is written based on the progress of the write operation, the data transfer managing component 113 can perform another write operation on at least one write unit of the secondary region with respective data of the subset of write units of the primary region, thereby migrating the data from the primary region to a secondary region, such that a whole number of secondary write units are written.

In some other implementations, the data transfer managing component 113 can receive data from the host system 120. The data transfer managing component 113 can write the data to one or more write units of a region of the memory device 130 having lower density blocks (e.g., SLC blocks). In response to determining that four write units of the SLC memory region are written with at least a portion of the data received from the host system 120, the data transfer managing component 113 can migrate respective data stored in the four write units of the region having lower density blocks to a single write unit of a region of the memory device 130 having higher density blocks (e.g., QLC blocks). Further details with regards to the operations of the data transfer managing component 113 are described below.

Figure 2:
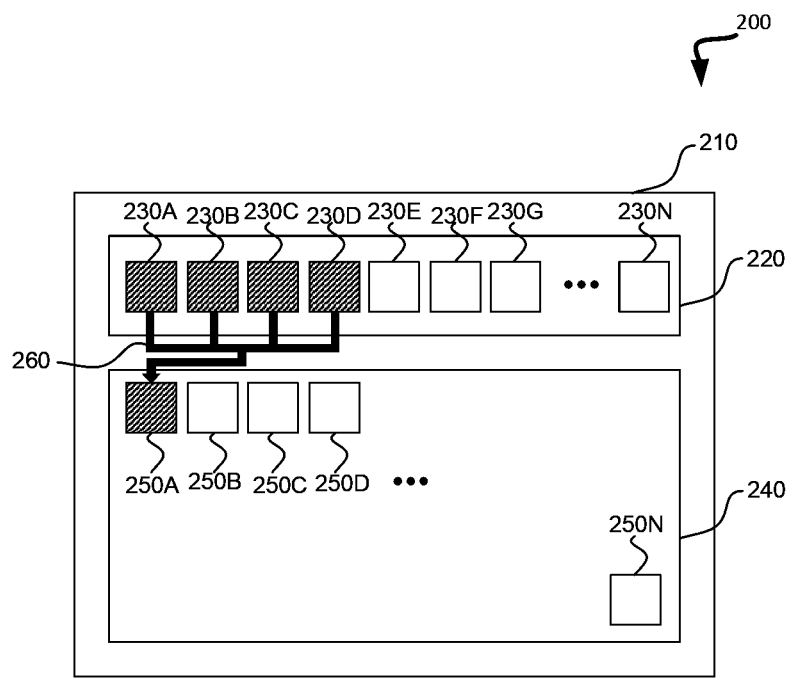
FIG. 2 is a block diagram of an example method to migrate data from one memory region to another memory region in accordance with some embodiments of the present disclosure.

FIG. 2 is a block diagram 200 of an example method to migrate data from one memory region 220 to another memory region 240 in accordance with some embodiments of the present disclosure. The method can be performed by processing logic that can include hardware (e.g., a processing device, circuitry, dedicated logic, programmable logic, microcode, hardware of a device, integrated circuit, etc.), software (e.g., instructions run or executed on a processing device), or a combination thereof. In some embodiments, the method is performed by the data transfer managing component 113 of FIG. 1. Although the method may be described in a particular sequence or order, unless otherwise specified, the order of the processes can be modified. Thus, the embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The processing device can receive data from a host system (e.g., the host system 120) for storage. In one embodiment, the data can be a part of a stream. A stream corresponds to a grouping of data stored at multiple write units of the memory device 210 based on a specific criteria such as an expected lifetime of data. Once the processing device receives the data, the processing device can store the data to the memory device 210. In one embodiment, the memory device 210 can include at least two distinct memory regions configured to have different memory densities (or bit densities)—a first memory region 220 and a second memory region 240. The first memory region 220 can be configured to have a smaller memory density than the second memory region 240. In one implementation, the first memory region 220 can be configured as a lowest density memory and the second memory region 240 as a highest density memory. For example, the first memory region 220 can be configured as a single-level cell (SLC) memory and the second memory region 240 can be configured as a quad-level cell (QLC) memory. In a further embodiment, the first memory region 220 can span a smaller area in the memory device 210 than the second memory region 240 as illustrated in FIG. 2. In other words, the first memory region 220 can include a smaller number of memory cells than the second memory region 240. The first memory region 220 can serve as a cache memory in the memory device 210.

When storing the data, the processing device can initially store or write the data received from the host system to the first memory region 220 and then migrate the data from the first memory region 220 to the second memory region 240 when a triggering condition is satisfied. For example, the processing device can write the data to a write unit (e.g., a write unit 230A-230N) of the first memory region 220. In one embodiment, the write unit can correspond to a page, which is a smallest write unit and includes a group of memory cells (e.g., SLCs). In another embodiment, a write unit can correspond to a block, which includes a group of such pages. The processing device can perform write operations to write units (e.g., write units 230A-230N) in a serial manner (e.g., one write unit by one write unit) or in parallel (e.g., multiple write units at a time). Moreover, the processing device performs write operations on write units in a sequence. Furthermore, the processing device can store data of the same stream to the first memory region 220. In other words, the processing device can store data of different streams at different memory devices, instead of intermixing data from different streams in one memory device.

While performing write operations to the write units (e.g., write units 230A-230N), the processing device monitors the progress of programming or writing operations in the first memory region 220 in order to identify a timing for migrating data from the first memory region 220 to the second memory region 240. For example, the processing device can determine how many write units of the first memory region 220 have been written on a periodic basis. As illustrated in FIG. 2, shaded write units 230A-230E represent write units that have been programmed or written. In the case where a write unit corresponds to a block, the write unit is considered written when all pages of the write unit have been are written. Other write units 230E-230N represent write units that have not been written.

In one embodiment, the processing device can determine whether the first four write units (e.g., the write units 230A-230D) of the first memory region 220 are programmed as the triggering condition for the migration. For example, in case the write unit corresponds to a page, the processing device can determine whether the four pages (e.g., the write units 230A-230D) are storing data. As another example, in case the write unit correspond to a block, the processing device can determine whether the four blocks (e.g., the write units 230A-230D) are fully written. That is, the processing device can determine whether all pages of each block (e.g., the write units 230A-230D) are programmed. If not all four write units (e.g., the write units 230A-230D) have been programmed, the processing device can either wait until they are all written or store dummy data at any of the write units in order to perform the migration process at a regular interval.

Once the processing device determines that the first four write units (e.g., the write units 230A-230D) are written, the processing device, at operation 260, can migrate the data stored in the four write units (e.g., the write units 230A-230D) to a write unit (e.g., the write unit 250A) of the second memory region 240. A write unit (e.g., the write units 250A-250N) of the second memory region 240 can correspond to either a page (i.e., a page having a group of QLCs) or a block (i.e., a block including a group of pages with QLCs). For example, the processing device can write data from four SLC blocks in the first memory region 220 to one QLC block in the second memory region 240. The processing device can write data from the four SLC blocks to a lower, upper, extra, and top pages of the QLC block in the second memory region 240 (e.g., via the multi-pass programming operation). In some implementations, the processing device can program the data to the write unit at once. Such programming technique is sometime called a one-shot programming scheme. According to the one-shot programming scheme, the processing device can program multiple pages in a wordline at a time. For example, the processing device can write data to all pages of a QLC block in the QLC memory at once. Although in FIG. 2, the first memory region 220 and the second memory region 240 are illustrated to be in the same memory device 210, the first memory region 220 and the second memory region 240 can be at different memory devices.

Subsequently, the processing device can determine whether another set of four write units (e.g., write units 230E-230H (not shown)) next in the sequence to the write units (e.g., the write units 230A-230D) of the first memory region 220 are written. In response to determining that the next four write units of the first memory region 220 are written, the processing device can migrate data written in the next four write units to a write unit (e.g., the write unit 250B) of the second memory region 240 that is next in the order to be programmed (e.g., the write unit 250B which is adjacent to the write unit 250A). Accordingly, the processing device can continue migrating data from the first memory region 220 to the second memory region 240 in such a lock-step manner. That is, as soon as four adjacent write units of the first memory region 220 are written, the processing device can perform a write operation of data stored in the four write units of the first memory region 220 to a single write unit of the second memory region 240. In some implementations, the processing device can perform the migration operation without notifying the host system. Also, the migration can be done while the processing device is storing data from the host system. In different embodiments, the first memory region 220 can be programmed to have different memory densities such as SLC or MLC, as long as the memory density of the first memory region 220 is lower than the memory density of the second memory region 240. Similarly, the second memory region 240 can be configured as a MLC, TLC, or QLC memory contingent upon the memory density of the second memory region 240 being higher than the memory density of the first memory region 220.

Figure 3A:
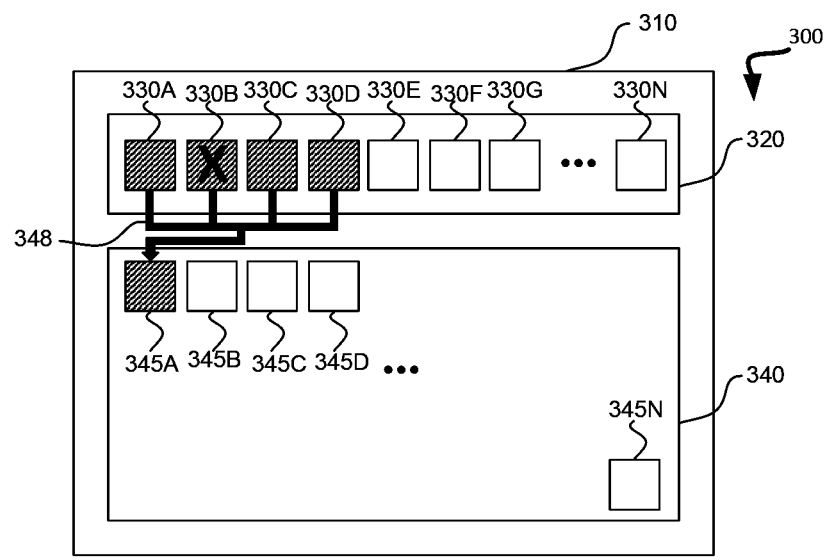
FIG. 3A is a block diagram of another example method to migrate data from one memory region to another memory region of a memory device in accordance with some embodiments of the present disclosure.

FIG. 3A is a block diagram 300 of another example method to migrate data from one memory region 320 to another memory region 340 of a memory device 310 in accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by the data transfer managing component 113 of FIG. 1. Although the method may be described in a particular sequence or order, unless otherwise specified, the order of the processes can be modified. Thus, the embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Similar to the method described with respect to FIG. 2, the processing device can receive data from a host system (e.g., the host system 120) for storage. In one embodiment, the processing device can first store the data to a memory region (e.g., a first memory region 320) of a memory device (e.g., a memory device 310), although the data will later be moved to another memory region (e.g., a second memory region 340) of the memory device (e.g., the memory device 310) having a higher memory density. As described above, the first memory region 320 can correspond to the first memory region 220 of the FIG. 2 and the second memory region 340 can correspond to the second memory region 240 of the FIG. 2. Accordingly, the first memory region 320 can be configured to be a single-level cell (SLC) memory as a cache memory and the second memory region 340 as a quad-level cell (QLC) memory. In other words, the first memory region 320 includes a group of write units (e.g., the write units 330A-330N), such as a block or a page each having a number of SLCs. Also, the second memory region 340 has a group of write units (e.g., the write units 345A-345N) such as a block or a page each including a number of QLCs.

While the processing device stores the data from the host system to the first memory region 320, specifically to one or more write units (e.g., write units 330A-330N) of the first memory region 320, the processing device can determine whether four write units that are adjacent to each other are written as a triggering condition for the migration. As an example, the processing device can determine that the first four write units (e.g., write units 330A-330D) are storing the data from the host system. Accordingly, the processing device can initiate the migration of the data from the first memory region 320 to the second memory region 340. In the meantime, the processing device can receive instructions from the host system to delete a part of data or a subdata (as marked by "x" in FIG. 3A) stored at the write unit 330B. In other examples, the host system can command the processing device to delete all data.

As long as the processing device determines that the first four write units (e.g., write units 330A-330D) are written, regardless of whether or not any of them stores invalid data, the processing device can retrieve data stored at all of the four write units (e.g., write units 330A-330D) for migration. Accordingly, at operation 348, the processing device can write the retrieved data that includes the invalid data (as marked by "X") from the write unit 330B to a write unit (e.g., a write unit 345A) of the second memory region 340 in a similar manner as described with respect to operation 260 of FIG. 2.

Once the data written to the first four write units (e.g., write units 330A-330D) has been migrated, the processing device can determine whether the next four write units (e.g., write units 330E-330H (not shown)) in the first memory region 320 are written and, if so, perform the migration operation, regardless of whether the host system has instructed to delete data stored at any of these write units (e.g., write units 330E-330H (not shown)). The processing device can perform the migration operation in such an iterative manner, while storing the data received from the host system 120.

Figure 3B:
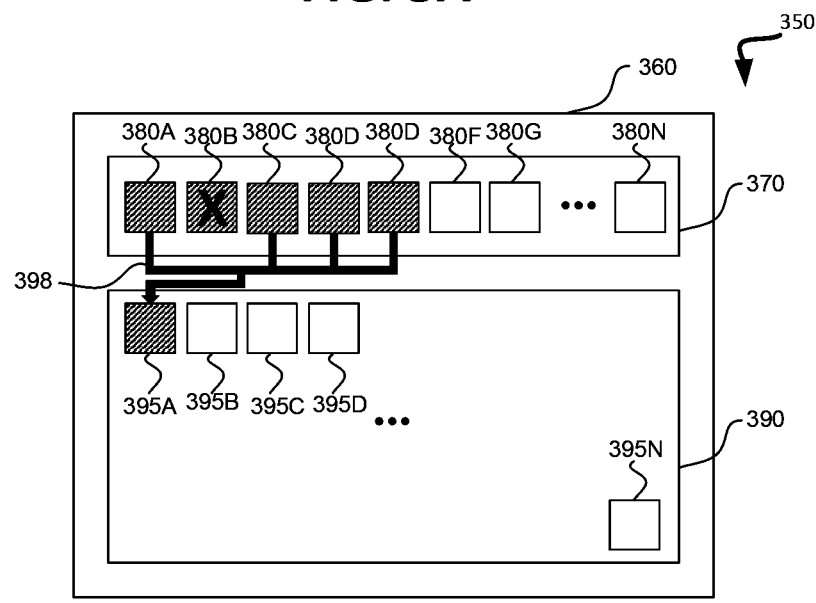
FIG. 3B is a block diagram of another example method to migrate data from one memory region to another memory region of a memory device in accordance with some embodiments of the present disclosure.

FIG. 3B is a block diagram 350 of another example method to migrate data from one memory region 370 to another memory region 390 of a memory device 360 in accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by the data transfer managing component 113 of FIG. 1. Although the method may be described in a particular sequence or order, unless otherwise specified, the order of the processes can be modified. Thus, the embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Similar to the method described with respect to FIG. 2, the processing device can receive data from a host system (e.g., the host system 120) for storage. In one embodiment, the processing device can first store the data to a memory region (e.g., a first memory region 370) of a memory device (e.g., a memory device 360), although the data will later be moved to another memory region (e.g., a second memory region 390) of the memory device (e.g., the memory device 360) having a higher memory density. The first memory region 370 and the second memory region 390 can correspond to the first memory region 220 and 240 of the FIG. 2, respectively. Accordingly, the first memory region 370 can be configured to be a single-level cell (SLC) memory and the second memory region 390 as a quad-level cell (QLC) memory. That is, the first memory region 370 includes a group of write units (e.g., the write units 380A-380N), such as a block or a page each having a number of SLCs. Similarly, the second memory region 390 has a group of write units (e.g., the write units 395A-395N) such as a block or a page each including a number of QLCs.

While the processing device stores the data from the host system 120 to one or more write units 380A-380N of the first memory region 370, the processing device can monitor a progress of write operations. In one embodiment, the processing device can monitor whether or not a write operation of the first four write units (e.g., the write units 380A-380D) has been completed. However, in any time before completely migrating the data stored in the four write units (e.g., the write units 380A-380D) to the write unit 395A of the second memory region 390, the processing device can receive a command from the host system to delete data stored in any (e.g., the write unit 380B) of the four write units (e.g., the write units 380A-380D). In response to receiving the delete command, the processing device can determine that the write unit (e.g., the write unit 380B) is storing invalid data as shown with "X". Once the processing device identifies that the write unit 380B stores the invalid data, the processing device can determine whether a write unit (e.g., the write unit 380E) next to the four write units (e.g., the write units 380A-380D) is written and stores valid data (e.g., the host system has not instructed to delete data stored at the write unit 380E). As such, the processing device can determine whether write operations at an updated set of four write units (e.g., the write units 380A-380C and 380E) has been completed.

In response to determining that the updated set of four write units (e.g., the write units 380A-380C and 380E) are written, the processing device can perform a migration operation. In one embodiment, the processing device can retrieve data stored in the updated set of four write units (e.g., the write units 380A-380C and 380E). The processing device can write the retrieved data to a write unit (e.g., a write unit 395A) of the second memory region 390. In one embodiment, the processing device can perform the migration operation while storing the data received from the host system. In some implementations, the processing device can perform the migration operation without notifying the host system. Subsequently, the processing device can perform another migration operation as soon as the processing device determines the next four write units of the first memory region 370 are written and stores valid data.

Figure 4:
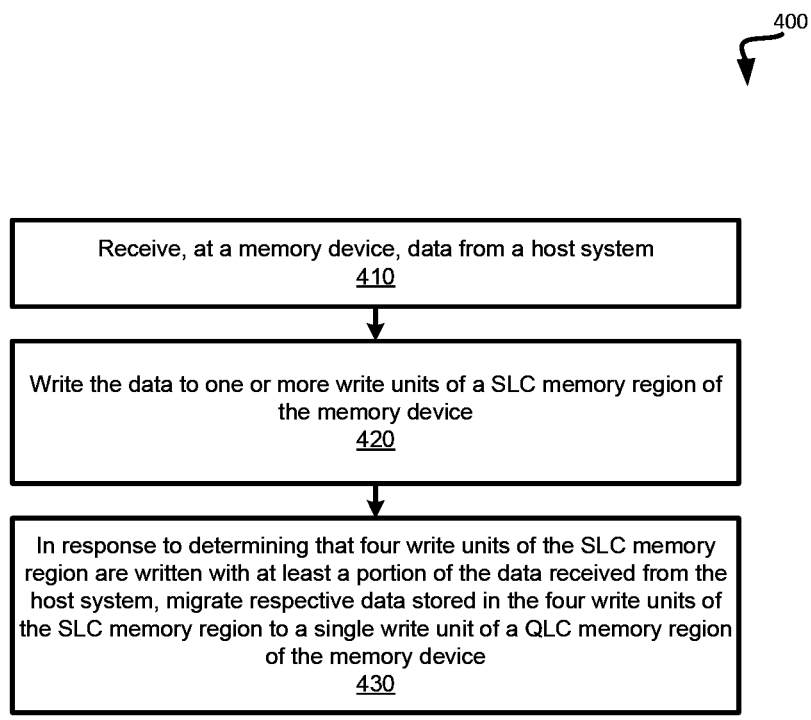
FIG. 4 is a flow diagram of an example method to migrate data stored in a single-level cell (SLC) memory region to a quad-level cell (QLC) memory region in accordance with some embodiments of the present disclosure.

FIG. 4 is a flow diagram 400 of an example method to migrate data stored in a single-level cell (SLC) memory region to a quad-level cell (QLC) memory region in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the data transfer managing component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing device receives data from a host system (e.g., the host system 120) of a memory device. In some implementations, the memory device can include different memory regions configured to have different memory density. For example, the memory device can include a single-level cell (SLC) memory region and a quad-level cell (QLC) memory region. The SLC memory region can be associated with SLCs. The QLC memory region can be associated with QLCs. In one implementation, the SLC memory region can be smaller in size than the QLC memory region having less number of memory cells allocated than the QLC memory region.

At operation 420, the processing device writes the data to one or more write units of a SLC memory region of the memory device. The SLC memory region can include multiple write units. A write unit can correspond to a page or a block having multiple pages.

At operation 430, in response to determining that four write units of the SLC memory region are written with at least a portion of the data received from the host system, the processing device migrates respective data stored in the four write units of the SLC memory region to a single write unit of a QLC memory region of the memory device. For example, the processing device can determine that memory density of four write units of the SLC memory region corresponds to the memory density of one write unit of the QLC memory region. In order to perform a write operation to a single write unit of the QLC memory region, the processing device can determine that four write units of the SLC memory region should store data. In one implementation, the four write units can be adjacent write units in the SLC memory region. Upon determining that the four write units of the SLC memory region are written, the processing device can migrate the respective data stored at the four write units of the SLC memory region to one write unit of the QLC memory region. In some implementations, the processing device can retrieve data from the four write units of the SLC memory region and program the retrieved data to the write unit of the QLC memory region at once. For example, in case the write unit of the QLC memory region corresponds to a page, the processing device can program all memory cells of the page at once. In another example where the write unit of the QLC region correspond to a block, the processing device can program all pages of the block at once.

In further implementations, the processing device can receive a command to delete a portion of data received from the host system. In one implementation, the processing device can receive the deletion command when the corresponding data is stored at the SLC memory region. The processing device can then consider the requested portion of the data to be invalid data. For example, the processing device can record, in a mapping table that maps logical addresses for the host system and physical addresses for the memory device, an indication that invalid data is stored at the corresponding write units. Moreover, the processing device can determine whether any of the four write units in the SLC memory region stores the invalid data.

In response to determining that at least one write unit of the four write units of the SLC memory region stores the invalid data, the processing device can determine a number of write units in the four write units that store invalid data. Based on the determined number, the processing device can determine the number of write units that are located in the four write units written with valid data. Subsequently, the processing device can migrate the valid data stored in the four write units to one write unit of the QLC memory region. Accordingly, the processing device can avoid transferring the invalid data to the QLC memory region. Thus, when the processing device determines that any of the initial four write units of the SLC memory region contains the invalid data, the processing device finds another write unit whose data can be copied over to the write unit of the QLC memory region.

In other implementations, the processing device can migrate data from the initially determined four write units of the SLC memory region to the write unit of the QLC memory region regardless of whether invalid data would be stored in the write unit of the QLC memory region. For example, in response to determining that a write unit of the four write units of the SLC memory region stores the invalid data, the processing device nevertheless migrates respective data stored in the four write units of the SLC memory region to the single write unit of the QLC memory region of the memory device.

In further implementations, after data from the four write units of the SLC memory region has been migrated, the processing device can determine whether the next four write units of the SLC memory region are written. The next four write units can correspond to a set of four write units that have been programmed after the initial four write units in the SLC memory region and located adjacent to the initial set of four write units. In response to determining that the next four write units of the SLC memory region are written, the processing device can migrate respective data stored in the next four write units of the SLC memory region to another write unit of the QLC memory region that is next to the write unit of the QLC memory region previously written with the data from the initial four write units of the SLC memory region.

Figure 5A:
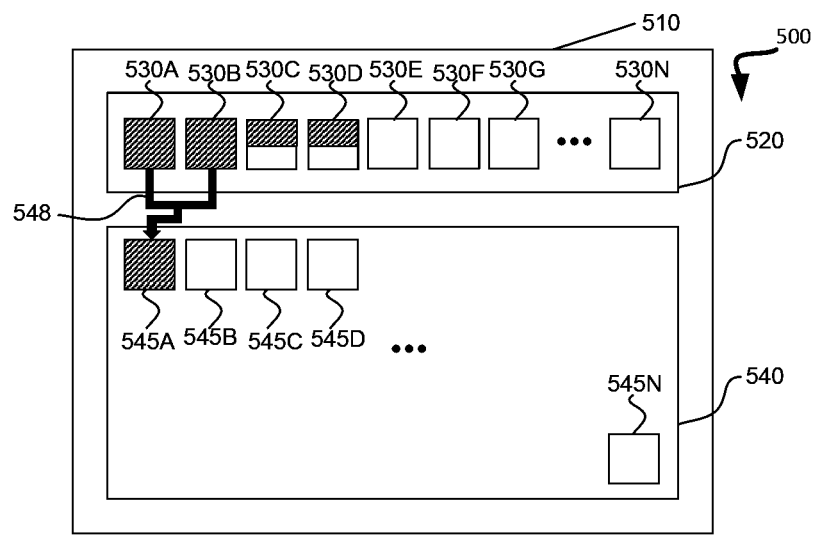
FIG. 5A is a block diagram of another example method to migrate data from one memory region to another memory region of a memory device in accordance with some embodiments of the present disclosure.

FIG. 5A is a block diagram 500 of another example method to migrate data from one memory region 520 to another memory region 540 of a memory device 510 in accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by the data transfer managing component 113 of FIG. 1. Although the method may be described in a particular sequence or order, unless otherwise specified, the order of the processes can be modified. Thus, the embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Similar to the method described with respect to FIG. 2, the processing device can receive data from a host system (e.g., the host system 120) for storage. In one embodiment, the processing device can first store the data to a memory region (e.g., a first memory region 520) of a memory device (e.g., a memory device 510) and later transfer the data to another memory region (e.g., a second memory region 540) of the memory device (e.g., the memory device 510). As such, the first memory region 520 can correspond to a cache memory for the memory device 510. In one implementation, the first memory region 520 can be configured to be at a lower density memory than the second memory region 540. For example, the first memory region 520 can be configured to be a multi-level cell (MLC) memory and the second memory region 540 as a quad-level cell (QLC) memory. Thus, the first memory region 520 can include a group of write units (e.g., write units 530A-530N), such as a page or a block, each having a group of MLCs. Moreover, the second memory region 540 has a group of write units (e.g., the write units 545A-545N) such as a block or a page each including QLCs.

As described above with respect to FIG. 2, the shaded area in the write units 530A-530N and 545A-545N represents data being written to the respective write unit. A fully shaded write unit illustrates a write unit fully programmed with data (e.g., in the case where a write unit corresponds to a block, all pages of the block are storing the data). In addition, a partially shaded write unit depicts that a write unit that is being written with data (e.g., in the case where a write unit corresponds to a block, some of the pages in the block are storing the data).

While data from the host system is being written to the write units in the first memory region 520, the processing device can determine how many write units in the first memory region 520 should be monitored regarding a progress of write operations. The processing device can determine the number of write units based on the memory density of the first memory region 520 and the second memory region 540. For example, the first memory region 520 is configured to have a memory density of a MLC; whereas, the second memory region 540 is configured to have a memory density of a QLC. In order to program one write unit (e.g., a write unit of 545A-545N) of the second memory region 540 at a time, the processing device can determine that data from two write units (e.g., write units 530A and 530B) of the first memory region 520 is needed. As such, the number of write units of the first memory region 520 that need to be written for migration depends on a ratio of the memory density of the first memory region 520 to the second memory region 540.

Accordingly, once the processing device determines that two write units (e.g., the write units 530A and 530B) of the first memory region 520 are written, the processing device at operation 548, can migrate data stored at the two write units (e.g., the write units 530A and 530B) of the first memory region 520 to a write unit (e.g., a write unit 545A) of the second memory region 540. Subsequently, the processing device can determine whether the next two write units (e.g., the write units 530C and 530D) are programmed. As illustrated, the two write units (e.g., the write units 530C and 530D) may not be fully programmed yet. In such a case, the processing device can wait until the write units (e.g., the write units 530C and 530D) are fully written before migrating the respective data to the next write unit (e.g., a write unit 545B) of the second memory region 540 (e.g., one to two ratio, thus data from two write units of the first memory region 520 is needed to program one write unit of the second memory region 540).

While data from the host system is still stored at the first memory region 520, the processing device can receive a request from the host system to delete some of the data that is for example, stored at the write unit 530B of the first memory region 520. In one implementation, the processing device can still proceed to move the data from, for example the write units 530A and 530B of the first memory region 520 to the second memory region 540. In a different implementation, the processing device can determine not to migrate the respective data from the write unit 530B. Instead, the processing device can determine whether the next write unit 530C is ready to be migrated (e.g., the write unit 530C is fully written and stores valid data (e.g., data that is not requested to be deleted). When the write unit 530C is written, the processing device can proceed to migrate data from the write unit 530A and 530C to the write unit 545A of the second memory region 540.

Figure 5B:
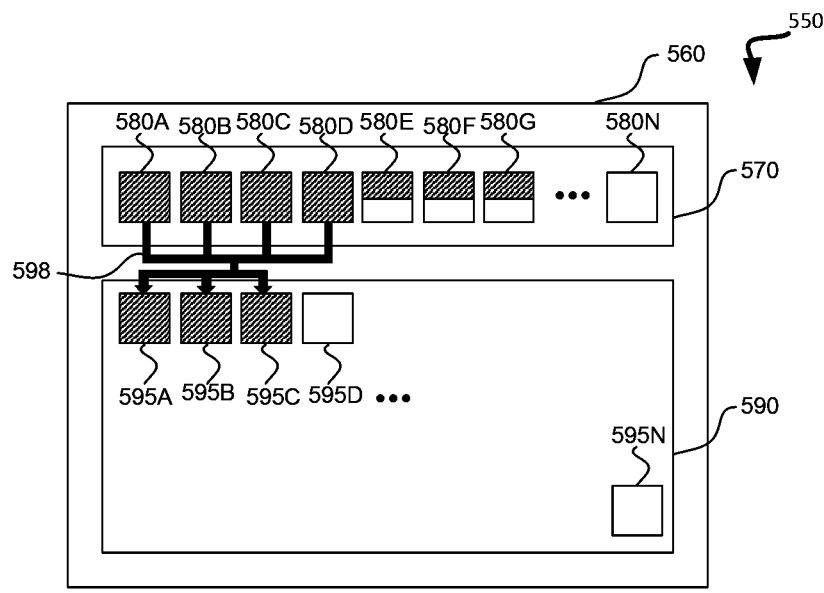
FIG. 5B is a block diagram of another example method to migrate data from one memory region to another memory region of a memory device in accordance with some embodiments of the present disclosure.

FIG. 5B is a block diagram 550 of another example method to migrate data from one memory region 570 to another memory region 590 of a memory device 560 in accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by the data transfer managing component 113 of FIG. 1. Although the method may be described in a particular sequence or order, unless otherwise specified, the order of the processes can be modified. Thus, the embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Similar to the method described with respect to FIG. 2, the processing device can receive data from a host system (e.g., the host system 120) for storage. The processing device can first store the data to a memory region (e.g., a first memory region 570) of a memory device (e.g., a memory device 560) and later transfer the data to another memory region (e.g., a second memory region 590) of the memory device (e.g., the memory device 560). The first memory region 570 can be configured to be a triple-level cell (TLC) memory and the second memory region 590 as a quad-level cell (QLC) memory. As such, the first memory region 570 can be configured to be at a lower memory density than the second memory region 590. In order to fully program a write unit of the second memory region 590, the processing device can determine to program three write units at a time based on the memory density of the first memory region 570 and 590 to avoid any write units of the second memory region 590 from being left as partially programmed. Accordingly, in this example, the processing device can monitor a progress of write operations to determine whether four write units (e.g., write units 580A-D) of the first memory region 570 are fully written. Once the four write units (e.g., write units 580A-580D) are written, the processing device can migrate data from the four write units (e.g., write units 580A-580D) to three write units (e.g., write units 595A-595C) of the second memory region 590. In one implementation, the processing device can read data stored at the four write units (e.g., write units 580A-580D) of the first memory region 570 and program the data to the three write units (e.g., write units 595A-595C) of the second memory region 590 at once (e.g., in a parallel manner).

Figure 6:
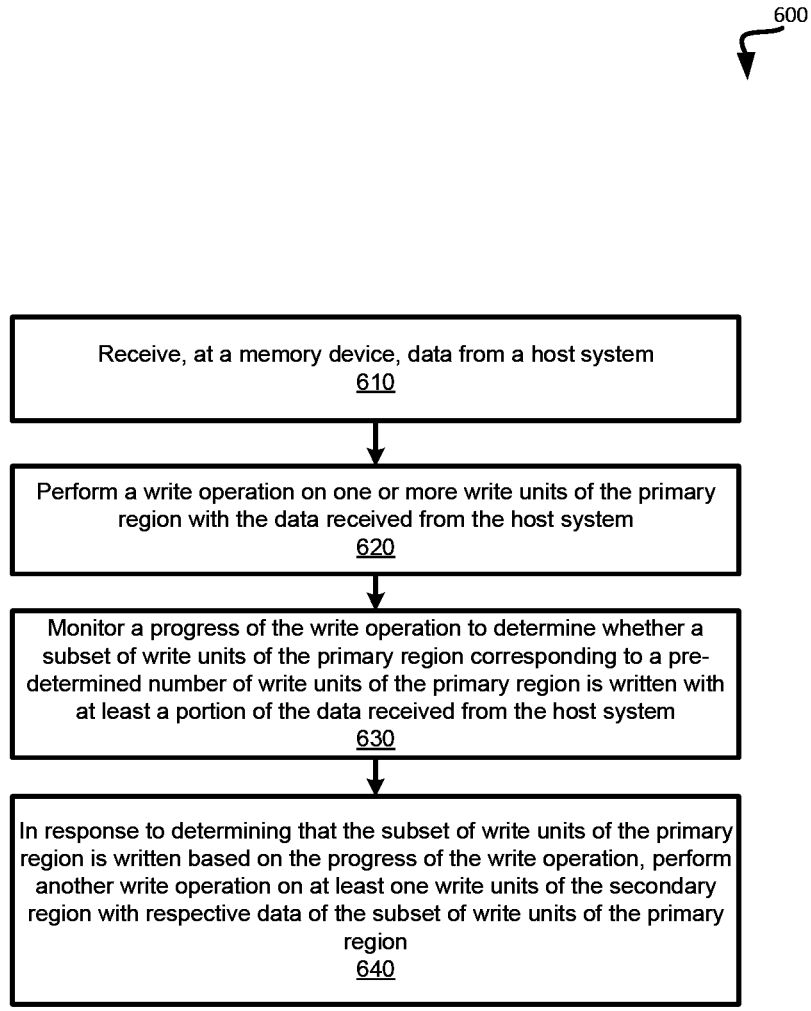
FIG. 6 a flow diagram of an example method to transfer data from one region of a memory device to another region of the memory device in accordance with some embodiments of the present disclosure.

FIG. 6 a flow diagram of an example method 600 to transfer data from one region of a memory device to another region of the memory device in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the data transfer managing component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing device receives data from a host system (e.g., the 120) of a memory device (e.g., the memory device 130 or the memory device 140). In some implementations, the memory device has a primary region and other secondary regions. The primary region can initially store the data received from the host system; whereas a secondary region can store data transferred (moved or migrated) from the primary region. In one implementation, the primary region can be configured to have a lower memory density than the secondary region. Accordingly, the processing device utilizes the primary region as a cache memory to quickly store data as received from the host system and later migrate the data in the cache memory to a different area of the memory device for a long term storage.

For example, the primary region can be associated with a single level cell (SLC). The primary region can include a group of write units and each write unit can have a group of memory cells. A write unit can correspond to a page or a block of pages. Thus, a write unit of the primary region can include multiple SLCs. Each SLC can store one bit per a memory cell. Accordingly, a write unit of the primary region can be programmed at a faster speed when compared to other memory cells storing more bits of data per memory cell in the secondary region. As an example, the secondary region can be associated with a multi-level cell (MLC), a triple-level cell (TLC), or a quad-level cell (QLC). In another implementation, the primary region can be associated with a MLC and the secondary region can be associated with a TLC or a QLC. Yet in another implementation, the primary region can be associated with a TLC and the secondary region can be associated with a QLC.

At operation 620, the processing device performs a write operation on one or more write units of the primary region with the data received from the host system. In one implementation, the processing device can write data to the write units in a sequential manner.

As another example, the primary region can be configured to have a memory density of TLC and the secondary region can be configured with a memory density of QLC. In such a case, four write units of the primary region can correspond to three write units of the secondary region. Thus, the processing device can determine four write units as the number of write units of the primary region having a total memory density corresponding to a memory density of three write unit of the secondary region.

At operation 630, the processing device monitors a progress of the write operation to determine whether a subset of write units of the primary region corresponding to a predetermined number of write units of the primary region is written with at least a portion of the data received from the host system. In some implementations, the processing device can monitor a number of write units at the primary region that have been programmed based on the data received from the host system. The processing device can determine the pre-determined number of write units to be monitored as a number of write units of the primary region having a total memory density corresponding to a memory density of at least one write unit of the secondary region. As an example, the primary region can be configured to have a memory density of SLC and the secondary region with a memory density of MLC. Thus, the total memory density of two write units of the primary region equals the memory density of one write unit of the secondary region. That is, data stored at two write units of the primary region can be migrated to one write unit of the secondary region. The same ratio of write units can apply when the primary region has a memory density of MLC and the secondary region with a memory density of QLC. Accordingly, the processing device can determine two write units as the number of write units of the primary region having a total memory density corresponding to a memory density of one write unit of the secondary region.

In the example where the primary region is configured to have a memory density of MLC and the secondary region with a memory density of QLC, the processing device can determine whether two write units in the primary region is storing data from the host system. In one implementation, the two write units can be located adjacent to each other in the primary region. The two write units can be sequentially programmed to store data. In another example where the primary region is configured to have a memory density of TLC and the secondary region with a memory density of QLC, the processing device can determine whether four write units in the primary region is storing data from the host system. The four write units can be located adjacent to each other in the primary region.

At operation 640, the processing device, in response to determining that the subset of write units of the primary region is written based on the progress of the write operation, performs another write operation on at least one write units of the secondary region with respective data of the subset of write units of the primary region. For example, the processing device can read the data stored in the subset of write units of the primary region and write the data to a write unit of the secondary region. The processing device can later erase the data stored in the subset of write units of the primary region.

In the case where the primary region is configured to have a memory density of MLC and the secondary region with a memory density of QLC, the processing device can read data stored at the two write units of the primary region and program the data to one write unit of the secondary region. Accordingly, the write unit of the secondary region can be programmed at once. As another example, in the case where the primary region is configured to have a memory density of TLC and the secondary region with a memory density of QLC, the processing device can read data stored at the four write unit of the primary region and program the data to three write unit of the secondary region. The processing device can perform the write operation in a serial or parallel manner.

In some implementations, a write unit in the subset of write units of the primary region can store invalid data. Invalid data can correspond to a portion of the data received from the host system that is subsequently requested by the host system to be deleted. For example, after receiving data from the host system, the processing device can later receive a command from the host system to delete the data or a portion of the data while the respective data is still stored in the primary region. In response, the processing device can still copy the invalid data from the primary region to the write unit of the secondary region. In one implementation, the processing device can record an address of the invalid data in the secondary region in a mapping table that maps logical block addresses for the host system to physical block addresses for the memory device. In another embodiment, the processing device can ignore the write unit of the primary region storing the invalid data and find another write unit whose data is to be transferred to the write unit of the secondary region in place of the write unit with the invalid data.

In further implementations, in response to determining that the subset of write units of the primary region is not fully written, the processing device can continue to write data from the host system to the rest of write units of the primary region until all write units in the subset of write units of the primary region are written. For example, in the case where the primary region is configured as a MLC memory and the secondary region as a QLC memory, the processing device can monitor a progress of the write operations to determine whether two write units have been programmed. If not, the processing device can wait until data is written to the two write units and as soon as the two write units are written, the processing device can initiate the migration of the respective data at the two write units to a write unit of the secondary region. Furthermore, after moving data from the two write units, the processing device can continue monitoring a progress of programming operations at the next two write units until the processing device finishes migrating data stored in the primary region to the secondary region.

Figure 7:
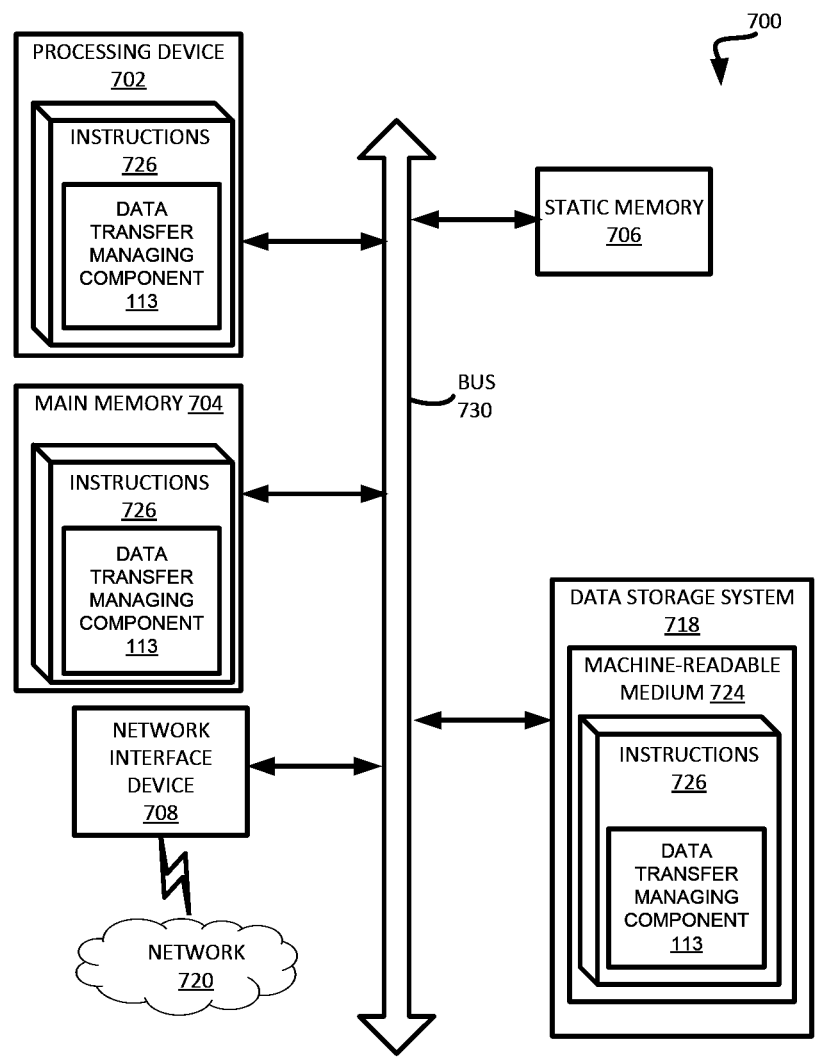
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data transfer managing component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a read and write voltage managing component (e.g., the data transfer managing component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a primary region to initially store data received from a host system and one or more secondary regions to store data transferred from the primary region; and
a processing device, operatively coupled with the memory device, the processing device configured to perform operations comprising:
receiving a first portion of a data stream from the host system;
performing a write operation on one or more write units of the primary region with the first portion of the data stream received from the host system, wherein a write unit of the primary region has lower density blocks than a write unit of the secondary region;
monitoring a progress of the write operation to determine whether a subset of write units of the primary region corresponding to a pre-determined number of write units of the primary region is written with the first portion of the data stream received from the host system;
determining that at least one write unit in the subset of write units of the primary region stores invalid data;
in response to determining that the subset of write units of the primary region is written based on the progress of the write operation, performing another write operation on at least one write unit of the secondary region with respective data of the subset of write units of the primary region, the respective data comprising the invalid data; and
receiving a second portion of the data stream from the host system.

2. The system of claim 1, wherein the operations further comprising:
determining the pre-determined number of write units as a number of write units of the primary region having a total memory density corresponding to a memory density of one or more write units of the secondary region.

3. The system of claim 1, wherein the operations further comprising:
in response to determining that the subset of write units of the primary region is not fully written based on the progress of the write operation, continuing to write another portion of the data stream from the host system to another one or more write units of the primary region until all write units in the subset of write units of the primary region are written.

4. The system of claim 1, wherein:
each write unit of the primary region is associated with a single level cell (SLC); and
each write unit of the secondary region is associated with a multi-level cell (MLC), a triple-level cell (TLC), or a quad-level cell (QLC).

5. The system of claim 1, wherein:
each write unit of the primary region is associated with a MLC; and
each write unit of the secondary region is associated with a TLC or a QLC.

6. The system of claim 1, wherein:
each write unit of the primary region is associated with a TLC; and
each write unit of the secondary region is associated with a QLC.

7. A method comprising:
receiving, at a memory device, a first portion of a data stream from a host system, the memory device comprising a primary region to initially store data received from the host system and one or more secondary regions to store data transferred from the primary region;
performing a write operation on one or more write units of the primary region with the first portion of the data stream received from the host system, wherein a write unit of the primary region has lower density blocks than a write unit of the secondary region;
monitoring a progress of the write operation to determine whether a subset of write units of the primary region corresponding to a pre-determined number of write units of the primary region is written with the first portion of the data stream received from the host system;
determining that at least one write unit in the subset of write units of the primary region stores invalid data;
in response to determining that the subset of write units of the primary region is written based on the progress of the write operation, performing another write operation on at least one write unit of the secondary region with respective data of the subset of write units of the primary region, the respective data comprising the invalid data; and
receiving, at the memory device, a second portion of the data stream from the host system.

8. The method of claim 7, further comprising:
determining the pre-determined number of write units as a number of write units of the primary region having a total memory density corresponding to a memory density of one or more write units of the secondary region.

9. The method of claim 7, further comprising:
in response to determining that the subset of write units of the primary region is not fully written based on the progress of the write operation, continuing to write another portion of the data stream from the host system to another one or more write units of the primary region until all write units in the subset of write units of the primary region are written.

10. The method of claim 7, wherein:
each write unit of the primary region is associated with a single level cell (SLC); and
each write unit of the secondary region is associated with a multi-level cell (MLC), a triple-level cell (TLC), or a quad-level cell (QLC).

11. The method of claim 7, wherein:
each write unit of the primary region is associated with a MLC; and
each write unit of the secondary region is associated with a TLC or a QLC.

12. The method of claim 7, wherein:
each write unit of the primary region is associated with a TLC; and
each write unit of the secondary region is associated with a QLC.

13. A method comprising:
receiving, at a memory device, a first portion of a data stream from a host system;
writing the first portion of the data stream to one or more write units of a region of the memory device having single-level cell (SLC) blocks; and
determining that four write units of the region of the memory device having SLC blocks are written with the first portion of the data stream received from the host system;

determining that at least one write unit of the four write units in the region of the memory device having SLC blocks stores invalid data;

in response to determining that four write units of the region of the memory device having SLC blocks are written with the first portion of the data stream received from the host system, migrating respective data stored in the four write units of the region of the memory device having SLC blocks to a single write unit of a region of the memory device having quad-level cell (QLC) blocks, the respective data comprising the invalid data; and receiving, at the memory device, a second portion of the data stream from the host system.

14. The method of claim 13, further comprising:

receiving a command to delete another portion of the data stream received from the host system, the invalid data corresponding to the another portion of the data stream associated with the command to delete.

15. The method of claim 14, further comprising:

in response to determining that the at least one write unit of the four write units of the region of the memory device having SLC blocks stores the invalid data, determining a number of write units in the four write units that store the invalid data;

determining one or more write units that correspond to the number of the write units and are not written with the invalid data, wherein the one or more write units are located next to the four write units; and migrating respective data stored in the one or more write units located next to the four write units and any one or more write units of the four write units that does not store the invalid data to the single write unit of the region of the memory device having QLC blocks.

16. The method of claim 13, further comprising:

determining whether another four write units of the region of the memory device having SLC blocks that are next to the four write units are written; and in response to determining that the another four write units of the region of the memory device having SLC blocks are written, migrating respective data stored in the another four write units of the SLC memory region to another write unit of the region of the memory device having QLC blocks that is next to the single write unit of the region of the memory device having QLC blocks.

17. The method of claim 13, wherein:

the region of the memory device having SLC blocks is smaller than the region of the memory device having QLC blocks;

a write unit of the region of the memory device having SLC blocks corresponds to a page comprising a plurality of SLCs, or a block comprising a plurality of pages; and a write unit of the region of the memory device having QLC blocks corresponds to a page comprising a plurality of QLCs, or a block comprising the plurality of pages.

\* \* \* \* \*